United States Patent [19]

von Bonin

[11] Patent Number: 5,034,056
[45] Date of Patent: Jul. 23, 1991

[54] FIRE PROTECTANTS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 441,197

[22] Filed: Nov. 22, 1989

Related U.S. Application Data

[63] Continuation of Ser. No. 235,344, Aug. 23, 1988, abandoned.

[30] Foreign Application Priority Data

Sep. 9, 1987 [DE] Fed. Rep. of Germany ....... 3730204

[51] Int. Cl.$^5$ ................................................ C09D 5/18
[52] U.S. Cl. ................................ 106/18.12; 106/18.13
[58] Field of Search ......................... 106/18.12, 18.13; 524/405, 437

[56] References Cited

U.S. PATENT DOCUMENTS

| | | | |
|---|---|---|---|
| 3,865,760 | 4/1975 | Pitts et al. | 106/15.05 |
| 4,126,473 | 11/1978 | Sobolev et al. | 106/18.12 |
| 4,722,959 | 2/1988 | Inoue et al. | 524/412 |

FOREIGN PATENT DOCUMENTS 0135261 3/1985 European Pat. Off. .
2339722 2/1974 Fed. Rep. of Germany .

Primary Examiner—William R. Dixon, Jr.
Assistant Examiner—Chris Gallo
Attorney, Agent, or Firm—Sprung Horn Kramer & Woods

[57] ABSTRACT

The invention relates to fire protectants containing aluminium hydroxide, which additionally contain natural and/or nearly natural calcium borate, their production and use, and semifinished goods and finished parts containing these fire protectants.

11 Claims, No Drawings

FIRE PROTECTANTS

This application is a continuation of application Ser. No. 235,344, filed 8/23/88, now abandoned.

The present invention relates to fire protectants containing aluminium hydroxide, their production and use, and semifinished goods and finished parts containing them.

Known fire protectants normally contain binders (for example cement, gypsum or synthetic substances) hydrated fillers (for example aluminium hydroxide), additives (for example melamine derivatives, phosphorus compounds and/or non-hydrated fillers), and if appropriate auxiliaries of the most diverse type (for example flow auxiliaries and/or pigments). A disadvantage of fire protectants of this type is that they are either fundamentally poor or first become ceramic or sinter at high temperatures (for example over 1,000° C.). Temperature regions thus frequently occur in the case of fire in which the mechanical protection against flames and extinguishing water is insufficient. Additives of alkali-containing substances improve, for example, the sintering behaviour of aluminium hydroxide, but such additives are very water-soluble and therefore not to be utilized in fire protectants.

Fire protectants containing aluminium hydroxide have now been found, which are characterized in that they additionally contain natural and/or nearly natural calcium borate.

Suitable aluminium hydroxide is, for example, Al(OH)$_3$, its hydrates, partially dehydrated types and aluminium oxide hydrates. Arbitrary mixtures of these substances can also be employed. Al(OH)$_3$ is preferred.

Suitable natural calcium borates are, for example, those which contain no additional constituents in addition to boron, calcium, oxygen and, if appropriate, water of crystallization, such as colemanite, fabianite, frolovite, borocalcite, ginorite, gowerite, inyoite, korzhinskite, meyerhofferite, nobleite, nifontovite, pandermite, pentahydroborite, priceite, sibirskite, tertschite, uralborite or vimsite. Suitable natural calcium borates are also those which, in addition to boron, calcium, oxygen and if appropriate water of crystallization, contain additional constituents, for example additional metals, in particular alkali metals, alkaline earth metals, aluminium, silicon and/or iron and/or additional non-metals, for example, chlorine, such as aldzhanite, axinite, bakerite, borkarite, braitschite, calciborite, chelkarite, danburite, datolite, franklandite, heidornite, hilgardite, hydroboracite, tincalcite, inderborite, sodium borocalcite, p-hilgardite, probertite, sakhaite, solongoite, ulexite or volkovite.

Such borates are mentioned, for example, in Gmelin Handbuch der anorganischen Chemie (Handbook of Inorganic Chemistry) or Hollemann-Wiberg, Lehrbuch der anorganischen Chemie (Textbook of Inorganic Chemitry).

Preferably, those Ca borates are used which are able to eliminate water at temperatures above 100° C., such as, for example, colemanite, borocalcite and pandermite, since their fire-protectant action is therefore comparable with that of Al(OH)$_3$ and synergistically supplements this.

Suitable nearly natural calcium borates are, for example, refined natural calcium borates, in particular products which are obtained by drying and/or removing impurities from natural calcium borates. Nearly natural calcium borates are also those, however, which have been commercially produced and correspond to natural calcium borates in their chemical composition.

Of course, a mixture of two or more natural and/or nearly natural calcium borates can also be present.

Natural calcium borates are preferred which contain no further constituents, in particular the mineral colemanite, in addition to boron, calcium, oxygen and if appropriate water of crystallization or water of hydration.

The ratio of aluminium hydroxide to calcium borate can be such, for example, that 25 to 70% by weight of aluminium hydroxide, relative to the weight of aluminium hydroxide+calcium borate, are present. Preferably, 35 to 60% by weight of aluminium hydroxide, relative to the weight of aluminium hydroxide+calcium borate, are present.

The aluminium hydroxide and the calcium borate are in general present in finely divided form. Preferably, their mean particle size is under 60 μm, particularly preferably between 1 and 25 μm. Aluminium hydroxide and calcium borate can exhibit an identical or a different mean particle size.

If appropriate, the aluminium hydroxide and the calcium borate can be ground to the particle size desired in each case.

A variant of the fire protectants according to the invention contains no additional constituents in addition to aluminium hydroxide and natural and/or nearly natural calcium borate. This variant can be attained, for example in the form of a pulverulent mixture of the two components for use. The two components can also be further subjected to shaping after mixing, for example by compressing and then, for example obtained as granules, tablets or sheets for use. Examples of uses for these variants of the fire protectants according to the invention are the filling of cavities in constructions and apparatuses and pourings in which, for example, cables or cable strands lie.

A second variant of the fire protectants according to the invention contains one or more binders in addition to aluminium hydroxide and natural and/or nearly natural calcium borate. Suitable binders are, for example, those with an inorganic basis, such as cements, gypsums, silica sols and silicic acid esters, but also those with an organic basis such as thermoplastic or rubber-like, where appropriate vulcanizable, polymers or solutions or latices of such polymers or precursors of such polymers or corresponding oligomers. Examples which may be mentioned are caprolactam polymers, caprolactone polymers, tetrahydrofuran polymers, olefin polymers, polyolefin polymers (for example polymers and copolymers of butadiene, isoprene, propylene, butene, isobutylene and copolymers of ethylene with acrylates or vinyl esters—for example vinyl acetate). Reaction resins and various synthetic resins or paint resins, alkyd resins, colophony resins, linseed oil resins, allyl resins, (meth-)acrylate resins, aliphatic or aromatic polycarbonate resins, polyester resins, polyamide resins, polyvinyl ester resins, unsaturated polyester resins, resins based on polyisocyanates, polyurethane resins, polyurea resins, polyisocyanurate resins, polycarbodiimide resins, furan resins, formaldehyde resins, phenol resins, urea resins, melamine resin, epoxide resins (for example based on dian-diepoxide), and also moisture-hardening silicon resins are also well suited.

A binder can be employed, and also preferably, but not necessarily, mixtures of binders compatible with one another.

1 to 80% of binder can be present, for example, relative to the weight of aluminium hydroxide+calcium borate+binder. Preferably this amount is 20 to 70%.

A further variant of the fire protectants according to the invention contains auxiliaries additionally to the components of the fir$t or second variants. The auxiliaries are, for example, fillers in powder, sphere, hollow sphere, leaf, needle, dumb-bell or fibre form (the latter also in the form of interlaced, knitted woven fabrics), colorants, scents, rheological auxiliaires, biocides, softeners, solvents, antistatics, water repellants, surfactants, propellants, adhesives, stabilizers, (for example against atmospheric influences, light and/or other radiations) and/or conductivity adjusters. Examples of auxiliaries of this type are calcium carbonate, magnesium oxide, magnesium hydroxide, dolomite, ground minerals, silicates, fly ash, silicic acids, mica, talc, zinc borate, graphite, swellable graphite, carbon black, sawdust, polypropylene, polyesters, aliphatic polyamides, aromatic polyamides, polyimides, polyacrylonitrile, cellulose, carbon, glass, kaolin, iron, copper, silver and asbestos.

The auxiliaries can be present, for example, in an amount from 0 to 30%, relative to the weight of aluminium hydroxide+calcium borate. Preferably this amount is 0.5 to 20%.

Examples of uses of the fire protectants according to the invention which contain binders and/or auxiliaries are plastics, cements, sealing materials, pourable materials, compressible materials, coating materials, paint binders, construction elements, shaped parts, fillings for cavities and semifinished goods which contain the fire protectants according to the invention or consist thereof. In total, a solid, porous or foam-like structure can be considered to be formed in the abovementioned use examples.

The present invention also relates to the production of fire protectants, which is characterized in that aluminium hydroxide, natural and/or nearly natural calcium borate, if appropriate binders and if appropriate auxiliaries are mixed with one another. The individual components can thus be as described in detail above by type and amount. During or after mixing, chemical and/or physical alterations brought about inevitably or desirably can take place. For example, binders can harden, oligomers or precursors of polymers can form polymers and/or water or solvents can be removed.

The present invention furthermore relates to fire-protected semifinished goods and finished parts, which are characterized in that they contain aluminium hydroxide, natural and/or nearly natural calcium borate, if appropriate binders and if appropriate auxiliaries or consist thereof. Semifinished goods and finished parts of this type are, for example, semifinished plastic goods and finished parts, coatings, mastics, compression-moulding materials, pourable materials, cements, paint binders, construction elements, shaped parts or fillings for cavities. The components present according to the invention can thus be as described in detail above by type and amount. Semifinished goods and finished parts of this type can contain, if appropriate, further components known per se additionally to the components according to the invention. They can also contain the components present according to the invention only on certain sites, for example on the surface or on openings.

The present invention finally also relates to the use of mixtures which contain aluminium hydroxide and natural and/or nearly natural calcium borate as fire protectants and for the production of fire-protected semifinished goods and finished parts. Details relating to the type and amount of aluminium hydroxide and calcium borate and relating to the semifinished goods and finished parts have already been described further above.

The fire protectants according to the invention, and also the semifinished goods and finished parts according to the invention are distinguished in that they yield, fundamentally and specifically also in the temperature range from about 750° to 1,000° C., well ceramicized or sintered ignition residues, which exert a good protective action against (further) flaming and extinguishing water.

EXAMPLES

In the following, the subject of the invention is illustrated by examples. The parts and percentages given relate to weight, unless stated otherwise.

EXAMPLE 1

100 parts of an ethylene/vinyl acetate copolymer having a vinyl acetate content of 45% (Lewapren ®45-0Bayer AG) were mixed with 170 parts of aluminium hydroxide (Apyral ®B2 from Bayer AG, particle size range 15 to 25 μm) and separately with 170 parts each of the following minerals on an unheated roller: calcium carbonate, dolomite, gypsum, sawdust, barite, carbon black, kaolin, ground shale, marl, iron oxide, talc, fly ash, wolastonite, zinc oxide, borocalcite and colemanite.

A 5 mm thick sheet was produced in each case. Strips of size 10×1 cm were cut from this sheet. These were placed in a muffle furnace and heated there from room temperature to 950° C. with the admission of air and left at 950° C. for 30 minutes. The sheets were then cooled.

After cooling, only the strips containing borocalcite and colemanite had formed a ceramic-like ignition residue approximately true to the shape and solidified by sintering processes. The other strips which contained calcium carbonate, dolomite, gypsum, sawdust, barite, carbon black, kaolin, ground shale, marl, iron oxide, talc, fly ash, wolastonite and zinc oxide were decomposed or had yielded a mechanically instable, pulverulent ignition residue.

This means that in the case of joint-sealing or cable-coating by means of a composition corresponding to one of these strips only the calcium borate/aluminium hydroxide combination shows sufficient protection against attack by flames.

EXAMPLE 2

A copolymer of ethylene and 35% ethyl acrylate was mixed with a 1.5-fold amount of diphenyl cresyl phosphate. 400 parts of a mixture of 40 parts of pandermite and 60 parts of aluminium hydroxide produced by joint grinding in a ball mill were worked into 100 parts of this mixture in a kneading apparatus. A viscous mastic material was obtained. A strand of 1 cm width and height and 10 cm length produced from this mastic material was heated at 1,000° C. for 1 hour in a muffle furnace. A ceramic, porous, mechanically stable likeness of the original strand remained.

EXAMPLE 3

100 parts of an ethylene/vinyl acetate copolymer having an ester content of 35% was kneaded with 150 parts of trioctyl phosphate and 900 parts of a mixture of 60% hydroboracite, 40% aluminium hydroxide and 3 parts of pyrogenic silicic acid. A mastic material marketable in a cartridge was obtained. A strand of this mastic material suitable for joint connection was heated at 950° C. in a muffle oven for 30 minutes with admission of air. After cooling, the formerly flexible strand was present as a solid sintered substance.

EXAMPLE 4

1,000 parts of a type of polyisobutylene having a viscosity at 75° C. of 9,500 cP were kneaded with 20 parts of pyrogenic silicic acid and 1,500 parts each of aluminium hydroxide and colemanite. A strand was formed from the mastic obtained and this was heated to 1,000° C. for 30 minutes with admission of air. A sintered substance in the form of the original strand remained.

In the following examples, a type of colemanite was used which contains 9% calcium carbonate as an impurity.

EXAMPLE 5

100 parts of a 50% strength latex of an ethylene/vinyl acetate copolymer having 50% vinyl acetate content were kneaded with one part of carboxymethylcellulose, 10 parts of trioctyl phosphate, 20 parts of hollow aluminosilicate beads (mean particle size 250 μm), 120 parts of aluminium hydroxide, 150 parts of colemanite, one part of pyrogenic silicic acid and one part of calcium silicate whiskers. The joint connection paste thus produced was marketable in a cartridge. A strand of this paste gave a solid sintered substance after drying and tempering at 1,000° C. This paste or its dilutions with water are well suited for coating or impregnating foamed plastics against the effects of fire.

EXAMPLE 6

100 parts of aluminium hydroxide, 140 parts of colemanite and 1.4 parts of pyrogenic silicic acid were jointly ground for 24 hours in a ball mill. This mixture was stirred with a mixture of equal parts of 15% strength silica sol and 10% strength sodium silicate to give a spreadable dispersion. Using this dispersion, a mineral wool sheet (bulk density 350 kg/m³, thickness 4 cm) was coated with a 5 mm thick layer on both sides. After drying, a piece of this sheet, standing on the cut surface so that the coated surface remained free, was heated in a muffle furnace at 1,000° C. After 25 minutes, the sheet was taken out and cooled.

A sealed, solid sintered layer had formed on both sides of the sheet.

In a fire resistance test (small fire chamber) according to DIN 4102, a fire resistance time of more than 120 minutes was measured with such sheets. The same sheet having an equally thick coating of cement only achieved a fire resistance time of less than 100 minutes.

EXAMPLE 7

A mixture of 50 parts of aluminium hydroxide and 50 parts of colemanite were ground for 14 hours in a ball mill, subsequently mixed with 20 parts of a commercial aromatic polyisocyanate (Desmodur ®44 V 10 from Bayer AG) and 1 ml of water and then compressed to a 6 mm thick sheet for 15 minutes at 300 bar and 130° C. in a sheet press. After cooling under pressure, a stable sheet was obtained which can be employed for flame-protectant purposes. A strip cut from this sheet was heated for 30 minutes in a muffle furnace at 1,000° C., by means of which a solid, ceramic-like sintered substance was formed.

EXAMPLE 8

The procedure of Example 7 was used, but the ground material was well mixed with 50 parts of glass fibre cuttings (mean length 9 mm) before compressing. The plate formed on tempering had properties as described in Example 7.

EXAMPLE 9

The procedure of Example 7 was used, but 30 parts of ammonium polyphosphate were added during grinding. After tempering, the sheet had properties as described in Example 7.

EXAMPLE 10

1,000 parts of a cold-hardening epoxide resin mixture (Lekuthern ®X 20 and hardener T 6 from Bayer AG) were admixed at 15° C. immediately after the preparation of 3,000 parts of a mixture of equal parts of aluminium hydroxide and colemanite. A solid tube having an internal diameter of 3 cm and a wall thickness of 7 mm was produced from the mixture by compressing in a mould and hardening at 20°–25° C. This tube was heated from room temperature to 980° C. in a muffle furnace with admission of air and tempered for one hour at 980° C. After cooling, a solid sintered substance was obtained from the material while maintaining the shape of the tube. These types of tube can then be used for the fire protection of cables.

EXAMPLE 11

The procedure of Example 10 was used, but the reaction mixture from a polyurethane pouring material (Baygal ® and Baymidur ® from Bayer AG) was employed instead of the epoxide resin mixture. The protected tube obtained gave a comparably stable sintered substance on tempering according to Example 10.

EXAMPLE Example 12

100 parts of the copolymer as used in Example 1 were kneaded with 350 parts of a mixture of 55% colemanite and 45% aluminium hydroxide. A 3 mm thick sheet was produced from this material on a roller mill. This sheet was provided on both sides with an adhesive paper width by rolling out at 80° C. 10 cm wide and 2 m long strips were cut from the paper-lined material and wrapped as binding on an electric cable. On flaming of the cable thus protected using a natural gas burner achieving a temperature of about 1,100° C., a certain expansion of the material of the protective binding began with concomitant carbonizing and subsequent ceramicization after burning off the external paper layer. The cable was effectively protected against attack by flames. With two-layered bindings, no short-circuit was established after 120 minutes of flaming.

EXAMPLE 13

The contents of a commercial cartridge containing moisture-hardening silicone mastic were mixed with 10 times its volume of dried methylene chloride and filtered clear through a pressure filter. The methylene chloride was removed by distillation from the solution obtained. 100 parts of the remaining silicone resin material were kneaded with 130 parts of aluminium hydroxide, 170 parts of colemanite and 2.5 parts of pyrogenic silicic acid (all dried at 110° C.) to again give a paste marketable in a cartridge having good surface adhesion.

A strip of 1 cm diameter was squeezed out from this paste and allowed to stand in the atmosphere, by means of which the hardening customary for silicone pastes of this type occurred. After 30 days, a 10 cm long piece of this hardened elastic strand was heated from room temperature to 1,000° C. in a muffle furnace and tempered for 30 minutes at 1,000° C. A mechanically hard, corresponding sintered piece was obtained.

By repeating the treatment in the muffle furnace, but this time with the original silicone mastic material, a mechanically non-loadable, crumbly material was obtained as an ignition residue.

EXAMPLE 14

100 parts of the polymer also used in Example 1 were kneaded in each case with 300 parts of calcium carbonate, 300 parts of gypsum, 300 parts of barite, 300 parts of aluminium hydroxide and a mixture of 150 parts of aluminium hydroxide and 150 parts of colemanite. 0.5 cm thick sheets were drawn from the kneaded mixtures, using an unheated roller mill as when mixing the solid constituents into the polymer.

1 cm wide test strips were cut from the sheets. These were placed on a 1.5 mm thick iron sheet in such a way that the strips projected 1 cm over the edge of the sheet. A Bunsen burner was then brought under the sheet at the site where the test strips overhung the sheet, and sheet and test strips were equally subjected to the blue inner cone of the Bunsen flame (about 1,100° C.).

After 1 minute of flaming, the Bunsen burner was removed. It showed that all test strips were again burnt, except for those which contained aluminium hydroxide and the aluminium hydroxide/colemanite mixture. These two last-mentioned strips were extinguished. Of these two strips, however, only the one to which aluminium hydroxide and colemanite had been added yielded a solid sintered substance.

EXAMPLE 15

100 parts of the polymer as used in Example 1, 30 parts of the polyester as used in Example 16 and 500 parts of a mixture of 55% colemanite and 45% aluminium hydroxide were mixed on an unheated roller and the mixture was granulated. The granules were added to an extruder working at 80° C. and discharged through
(a) a round nozzle heated to 110° C. as a strand of 0.5 cm diameter and
(b) a flat profile nozzle heated to 110° C. as a band of 5 mm thickness and 5 cm width.

The round profile and the flat profile were used for wrapping tubes and cables to be protected against flaming. They can also be used for the connection of joints.

Additionally, the granules produced as described above were processed at 110° C. by a spiral injection moulding machine for the production of closure stoppers in the form of commercial rubber stoppers. After moulding, the conical stoppers, whose ratio of greatest diameter to height was 1:1, were used for the fireproof closure of cable openings in cable partitions. In testing the fire resistance time according to DIN 4102, such stoppers gave fire resistance times of over 120 minutes in gas concrete walls. Pierced stoppers of this type can be used as gas tight and moisture-tight cable lead-ins.

EXAMPLE 16

100 parts of a polymer as used in Example 1, 100 parts of a polyester of adipic acid and ethylene glycol, pentaerythritol and glycerol (OH No. 157, viscosity at 74° C., 4,500 mPas) and also 600 parts of a mixture of 35% aluminium hydroxide, 10% magnesium hydroxide and 55% colemanite were mixed on an unheated roller. An elastic mastic material resulted. This mastic material was rolled out as a coating on a glass fibre fabric which was used for covering cables and cable conduits against the effects of fire. A 0.5 cm wide strip of this mastic ceramicized on flaming with slight expansion without burning after removal of the flame. Only small amounts of smoke were observed, and no carbon black was formed.

EXAMPLE 17

10 parts of the polymer used in Example 1 and 10 parts of the polyester used in Example 16 were mixed at room temperature in a kneader with 60 parts of a mixture of equal parts of colemanite and aluminium hydroxide. A cotton fabric was ined with this mixture in a thickness of 2.5 mm on the unheated roller. After running through a heated space operated at a temperature of 120° C. with a retention time of 15 seconds and subsequent cooling, the lined cotton fabric was wound up. It did not stick together. This type of finished fabric can be used for the protection of cables, pipes and openings against penetration by flames, as can be seen from the following test:

A sample having 3 cm diameter and 5 mm thickness was cut from the mixture used for the coating, heated in a muffle furnace at 940° C. and taken out of the muffle furnace after 30 minutes. A ceramicized, porous piece of material was obtained, which showed about a doubled volume compared to the state before heating. This means that slits and openings sealed with material of this type even in case of fire safely assure sealing off of space without loss of volume.

EXAMPLE 18

A mastic was produced from 30 parts of the polyester also used in Example 16 and 80 parts of the filler mixture used in Example 15 by kneading at room temperature, after which 3% of pyrogenic silicic acid was mixed with the filler. This mastic had sufficient adhesive power to adhere well to a vertically standing steel sheet as a strand squeezed out of a mastic gun. On heating the back side of the steel sheet, the strand did not melt off the steel sheet or slide away, but it remained adhered to the sheet and expanded slightly. On flaming with a natural gas burner, no after-burning of the mastic occurred, and ceramicization occurred at about 900° C.

EXAMPLE 19

In a commercial, halogen-free mixture for the production of cable sheaths based on ethylene/vinyl acetate copolymer (Levap ® 450 from Bayer AG), in which 190 parts of aluminium hydroxide were contained per 100 parts of polymer in addition to extenders and vulcanization auxiliaries, 100 parts of the aluminium hydroxide contained were replaced by pandermite, which had been ground to a particle size from 1 to 2 μm. This mixture for the production of a cable sheath was mixed and vulcanized according to the prior art, after it had been compressed to bonded sheets of 0.5×25×25 cm. These bonded sheets were used for covering cable lead-ins, and the cables were led through after perforation.

In the flaming test, in which 1,000° C. was achieved after 60 minutes, the sheet material sintered after expanding by 160% by volume to a mechanically solid sintered substance having a ceramic ring. On subjecting to a flame and flaming for 2 minutes, the material did not burn after removal of the burner flame.

EXAMPLE 20

A cable route having a U-shaped cross-section manufactured from a steel sheet was led through a small fire chamber in such a way that the burner flame impinged on the middle of one side of the route. The cable route was covered over its total width of 10 cm with an aluminium hydroxide/colemanite mixture 2 cm high in a ratio of 1:1. 3 telephone cables and 3 commercial heavy current cables were then placed on the filling and the route was then covered up to 1 cm under its full height with further aluminium hydroxide/colemanite mixture. The covering towards the top was performed with a calcium silicate sheet of 6 mm thickness. The heavy current cables (NYM-I 4×6) and the telephone cables were connected in such a way that a short circuit or a break in the line made itself noticeable by the extinguishing of a lamp.

The fire chamber was then fired for 120 minutes in accordance with the standard temperature curve according to DIN 4102 (STC) based on DIN 4102.

No short-circuit and no break in the line occurred in this time. The filling of the route was externally sintered together to give a solid sintered block, and in the interior the pulverulent filling remained preserved. The cables were attacked, however, but the cable sheaths essentially remained intact.

EXAMPLE 21

65 parts of colemanite, 65 parts of Al-hydroxide (Apyral B 2, Bayer AG), 50 parts of a commercial polyol of the idealized formula $(C_2H_5O)_2PHCH_2N(C_2H_4OH)_2$, water content about 0.25%, 55 parts of commercial polyisocyanate obtained by phosgenation of aniline/formaldehyde condensates and having an NCO content of about 30% (Desmodur ® 44 V 40 Bayer AG) are stirred to homogeneity at room temperature within 20 seconds and introduced into a beaker mould. The reaction mixture begins to foam up in the mould. After about 300 seconds, the foamed plastic moulding can be removed from the mould previously treated with a parting compound based on paraffin.

The foamed plastic moulding has a bulk density of about 250 kg/m$^3$. This burns weakly on flaming with a Bunsen burner flame, with little generation of smoke, and on removing the flame spontaneous extinguishing occurs within 10 seconds. On tempering in a muffle furnace between 900° and 950° C., a mechanically stable sintered substance is obtained.

Isolating bonded sheets for fire-resistant cable lead-ins can be produced from the foamed plastic material and also cladding for instruments and valves to be protected against the effects of fire.

What is claimed is:

1. An aluminum hydroxide-containing fire protectant, which consists essentially of (a) aluminum hydroxide, (b) one or more of natural calcium borate, refined natural calcium borate or commercially produced calcium borate corresponding in chemical composition to natural calcium borate and (c) copolymers of ethylene with vinyl esters.

2. A fire protectant according to claim 1, wherein the aluminum hydroxide comprises Al(OH)$_3$, its hydrates, partially dehydrated types and/or aluminum oxide hydrate.

3. A fire protectant according to claim 1, wherein the calcium borate contains no further constituents in addition to boron, calcium and oxygen.

4. A fire protectant according to claim 1, wherein the calcium borate contains boron, calcium, oxygen and water of crystallization.

5. A fire protectant according to claim 1, wherein the calcium borate contains water of crystallization in addition to boron, calcium and oxygen.

6. A fire protectant according to claim 1, wherein the calcium borate is able to eliminate water at temperatures above 100° C.

7. A protectant according to claim 1, which contains 25 and 70% by weight of aluminium hydroxide relative to the weight of aluminum hydroxide and calcium borate.

8. A method of fire protection in which an aluminum hydroxide containing fire protectant according to claim 1 is applied as a fire protecting agent.

9. A fire protectant according to claim 1, wherein the natural calcium borate is selected from the group consisting of colemanite, fabianite, frolovite, borocalcite, ginorite, gowerite, inyoite, korzhinskite, meyerhofferite, nobleite, nifontovite, pandermite, pentahydroborite, priceite, sibirskite, tertschite, uralborite and vimsite.

10. A fire protectant according to claim 1 wherein the natural calcium borate is selected from the group consisting of aldzhanite axinite, bakerite, borkarite, braitschite, calciborite, chelkarite, danburite, datolite, franklandite, heidurnite, hilgardite, hydroboracite, tincalcite, inderborite, sodium borocalcite, p-hilgardite, probertite, sakhaite, solongoite, ulexite and volkovite.

11. A fire protectant according to claim 6, wherein the calcium borate is selected from the group consisting of colemanite, borocalcite and pandermite.

* * * * *